United States Patent [19]

Abel

[11] Patent Number: 4,947,089

[45] Date of Patent: Aug. 7, 1990

[54] APPARATUS FOR SELECTIVELY CONTROLLING A PLURALITY OF ELECTRIC MOTORS

[75] Inventor: Donald B. Abel, Appleton, Wis.

[73] Assignee: Abel Manufacturing Co., Inc., Appleton, Wis.

[21] Appl. No.: 434,805

[22] Filed: Oct. 30, 1989

[51] Int. Cl.⁵ ..................... G01G 19/34; G01G 11/12
[52] U.S. Cl. ......................... 318/34; 318/59; 318/66; 177/70; 177/121; 366/133; 366/141; 222/63
[58] Field of Search ....................... 318/34, 53, 59, 66, 318/101, 102, 103; 177/7, 8, 9, 70, 55, 56, 57, 59, 60, 64, 120, 121, 119; 366/19, 20, 41, 43, 44, 45, 49, 50, 133, 141, 150, 151, 152, 156, 184, 185, 186, 601; 222/14, 52, 63, 77

[56] References Cited

U.S. PATENT DOCUMENTS

| | | | |
|---|---|---|---|
| 2,787,402 | 4/1957 | Stiner et al. | 222/76 |
| 2,923,438 | 2/1960 | Logan et al. | 222/2 |
| 3,108,647 | 10/1963 | Harmon et al. | 177/57 X |
| 3,203,591 | 8/1965 | Daulton et al. | 177/64 X |
| 3,528,518 | 9/1970 | Mayer | 177/70 |
| 3,670,923 | 6/1972 | Hawes et al. | 366/601 X |
| 3,822,056 | 7/1974 | Hawes | 222/1 X |
| 3,918,539 | 11/1975 | Wise | 177/210 |
| 3,985,266 | 10/1976 | Wright | 177/16 X |
| 4,111,335 | 9/1978 | Arya et al. | 222/57 |
| 4,222,448 | 9/1980 | Sunkle et al. | 177/1 |
| 4,298,831 | 11/1981 | Espelage et al. | 318/112 |
| 4,353,015 | 10/1982 | Krampe et al. | 318/41 |
| 4,441,567 | 4/1984 | Hirano | 177/59 X |
| 4,454,924 | 6/1984 | Minamida | 177/59 X |
| 4,561,781 | 12/1985 | Seymour | 366/186 X |
| 4,562,388 | 12/1985 | Wolf | 318/49 X |
| 4,644,232 | 2/1987 | Nojiri et al. | 318/66 |
| 4,658,920 | 4/1987 | Matsumoto et al. | 177/70 X |
| 4,705,083 | 11/1987 | Rossetti | 366/605 X |
| 4,712,590 | 12/1987 | Gianfilippo | 222/77 X |
| 4,815,042 | 3/1989 | Pratt | 366/141 |

OTHER PUBLICATIONS

Eaton Model AF-1500 Adjustable Frequency A.C. Drives, Instruction Manual.
Square D Class 8005 Model 50 Programmable COntroler, Instruction Bulletin, Mar. 1988.

Primary Examiner—Bentsu Ro
Attorney, Agent, or Firm—Godfrey & Kahn

[57] ABSTRACT

An apparatus for selectively controlling a plurality of electric motors for driving individual work objects, the apparatus including an electrical switch which is adapted to produce predetermined speed signals for the electric motor selected, a programmable controller disposed in signal receiving relation relative to the electrical switch and which is adapted to generate a predetermined signalling sequence in response to the signal received from the electrical switch, a variable speed motor drive electrically coupled with the programmable controller, and with the electric motor selected, the variable speed motor drive selectively driving the selected electric motor at a predetermined speed in response to the signalling sequence received from the programmable controller, and a sensor adapted to indicate the work performed by the electric motor whereby the electric switch may be selectively adjusted to control the operation of the electric motor selected.

18 Claims, 8 Drawing Sheets

APPARATUS FOR SELECTIVELY CONTROLLING A PLURALITY OF ELECTRIC MOTORS

BACKGROUND OF THE INVENTION

1. Field of the Invention

The present invention relates to an apparatus for selectively controlling a plurality of electric motors and the like, and more particularly to such an apparatus which is operable to selectively drive individual electric motors which are coupled to a work object, the apparatus herein described having particular utility when employed in combination with a machine for blending numerous materials into an end product having a desired composition, and wherein the apparatus is further adapted to selectively control the individual electric motors in a predetermined fashion as to speed and general operation by using a single variable speed motor drive.

2. Description of the Prior Art

In the production of various products which may contain various pharmaceutical components such as, for example, feeds for livestock which may contain selective volumes of drug supplements, assorted machinery has been designed, developed and manufactured with the idea in mind of eliminating as much manual labor as possible. Micro-ingredient batching systems, as they have come to be known, have been characterized heretofore by highly labor intensive operations and therefore the direct cost of labor and equipment that were required to effectively combine a variety of constituent elements was generally substantial. A variety of devices have been developed and employed over the years for this purpose. More particularly, the prior art is replete with a multiplicity of prior art references which are directed to automatic batch weighing systems such as that exemplified by U.S. Letters Pat. No. 4,222,448 to Sunkle, et al. and which are dated to compound batches of a plurality of constituents in accordance with a predetermined formula.

Heretofore many of the prior art devices have utilized hydraulic motors for driving the selected work objects which are integral subassemblies of these prior art batching machines. Hydraulic motors have been the selection of choice for a number of important reasons. For example, and one of the most important reasons for selecting hydraulic motors has usually been the concern regarding the cost of manufacturing the batching machines. As should be understood, the speed and the actuation of hydraulic motors may be selectively controlled by a relatively inexpensive value assembly whereas, in the case of electric motors, these devices may be adjusted as to speed only by using a variable speed motor drive which is quite costly. Further, electric motors were often not employed due, in part, to the dust environment in which these batching or blending machines normally operate; it being understood that electric motors could create an explosion hazard.

While the batching and blending systems and machines utilized heretofore have operated with some degree of success, they have exhibited numerous shortcomings which have detracted from their usefulness. For example, and while hydraulic motors normally operate quite efficiently, they often require more than just periodic maintenance. For example, and regardless of the application, labor intensive tasks such as replacing leaky fittings and filters or changing hydraulic fluid, replacing worn or burst hoses or worn pumps and the like, normally requires a substantially constant and diligent preventive maintenance program. Further, and regardless of the preventive maintenance applied, most hydraulic motors will eventually leak, thereby creating various hazards. In addition to the foregoing and regardless of the quality of the hydraulic valves employed to control the individual hydraulic motors, such valve assemblies will experience wear and will eventually leak. When such leaking occurs, the affected hydraulic motor, which may be disposed in driving relationship relative to a conveyor on a prior art batching assembly, may begin to slowly turn, thereby adding material(s) to an end product without an operator's knowledge. As should be readily apparent and if the selected material contains a drug, the final end product may contain extremely hazardous levels of this same material. If this end product is a feed supplement, for example, the ingestion of same could have deleterious health consequences for the livestock consuming it. The use of electric motors in such a batching system would have a desirable benefit inasmuch as there is no likelihood that an electric motor would drive a conveyor when no power is being applied to the selected motor, thereby reducing the likelihood that errors would occur in preparing a batched end product.

Still another problem encountered in the prior art batching machines and related assemblies which have been designed for such use is the propensity for such mechanisms to exhibit a characteristic inability to cooperate with other devices near to or connected with the batching machine.

Therefore, it will be seen that the prior art batching machines do not balance the practical needs of the micro-ingredient batching industry and the interrelated parameters of efficiency, cost effectiveness and safety which is particularly critical to the profitability of such operations.

Therefore, it has long been known that it would be desirable to have an apparatus for selectively controlling a plurality of electric motors at a variety of different speeds and which are adapted to drive individual work objects, and which could be employed in a wide variety of different industrial environments, and on an assortment of different machines and other devices, and which could be manufactured and purchased at a relatively moderate cost and which is both highly efficient in operation, and which further reduces to an absolute minimum the assorted problems associated with the use of hydraulic motors in connection with related prior art assemblies.

SUMMARY OF THE INVENTION

Therefore, it is an object of the present invention to provide an improved apparatus for selectively controlling a plurality of electric motors as to speed and other operating parameters for driving individual work objects.

Another object of the present invention is to provide such an apparatus which has particular utility when operating in combination with a blending machine and which is adapted to selectively and accurately combine a plurality of materials into an end product.

Another object of the present invention is to provide such an apparatus which is operable to obtain the individual benefits to be derived from related prior art blending machines while avoiding the detriments individually associated therewith.

Another object of the present invention is to provide such an apparatus which is particularly well suited when used in combination with a blending machine to precisely meter the individual materials to be blended and to deliver such materials for combination with other materials to form an end product having a predetermined formula.

Another object of the present invention is to provide an apparatus which is operable to provide flexible electric motor speed control whereby the individual electric motors may be assigned predetermined speed values which permits an operator to achieve increased batching speed and efficiency while maintaining commercially acceptable accuracy.

Another object of the present invention is to provide such an apparatus which is operable to deliver selected volumes of materials to be blended rapidly, dependably and efficiently while reducing to an absolute minimum the possibility of malfunction.

Another object of the present invention is to provide such an apparatus which is of relatively moderate cost to purchase and maintain, and which further is relatively inexpensive to operate per volume of end product produced during the blending process.

Another object of the present invention is to provide such an apparatus which can be adapted to incorporate conventional blending and batch processing technology for the purpose of further increasing the speed and efficiency with which a given volume of end product can be produced during the blending process.

Another object of the present invention is to provide such an apparatus which is characterized by ease of employment, simplicity of construction, and which can be sold at a relatively moderate price.

Another object of the present invention is to provide such an apparatus which includes a convenient means for rapidly disassembling an associated conveyor assembly for daily sanitary maintenance, modification or the like.

Still another object of the subject invention is to provide an apparatus which may be manufactured as an integral subassembly of a related machine or which further may be manufactured in the manner of a retrofit.

Further objects and advantages are to provide improved elements and arrangements thereof in an apparatus for the purposes described which is dependable, economical, durable and fully effective in accomplishing its intended purposes.

These and other objects and advantages are achieved in a method and apparatus for selectively controlling a plurality of electric motors for driving individual work objects and the like, the apparatus including means for selecting the individual electric motors, the selection means producing variable speed control signals, and on/off control, for the individual electric motors; means coupled to the selection means for generating a predetermined signalling sequence in response to the selection of the individual electric motors, the signal generating means coupled with each of the electric motors; a variable speed motor drive coupled with the signal generating means and with each of the individual electric motors, the variable speed motor drive selectively driving the individual electric motors at predetermined speeds in response to the signalling sequence received from the signal generating means; and means for sensing the work performed by each of the work objects whereby the selection means may be selectively adjusted to control the operation of the individual electric motors.

DESCRIPTION OF THE PREFERRED EMBODIMENT

Figure 1:
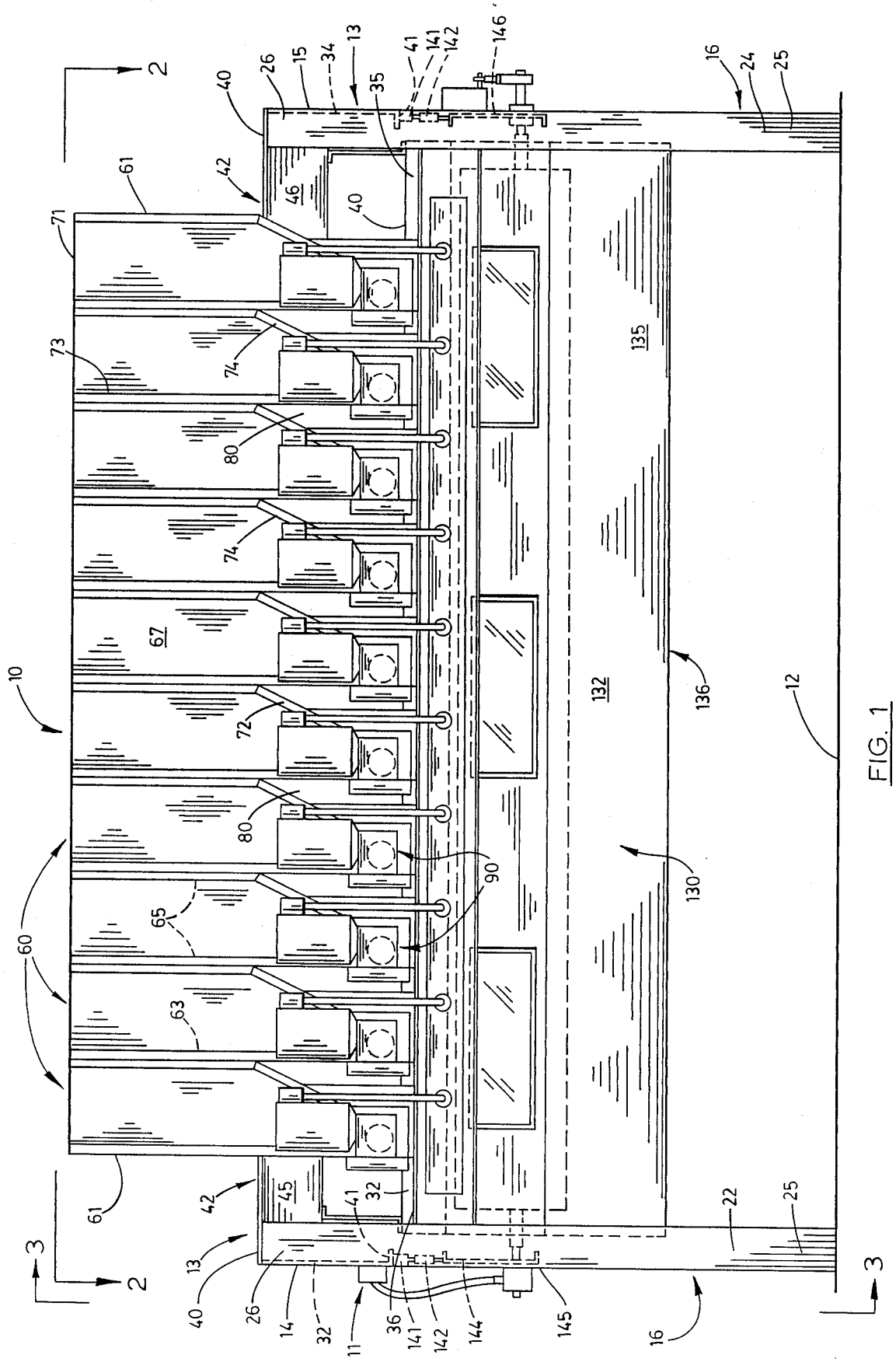
FIG. 1 is a side elevation view of a blending machine for combining a plurality of different materials into an end product having a predetermined composition and which employs the apparatus for selectively controlling a plurality of electric motors for driving individual work objects.

Referring more particularly to the drawings, the apparatus which is selectively controlling a plurality of electric motors of the present invention is generally indicated by the numeral 10 in FIG. 1. For illustrative convenience, the apparatus is shown and described herein as it would be configured if it were made integral with a blending machine 11 which will be discussed in further detail hereinafter. It should be understood, however, that the apparatus of the subject invention is not limited to such a blending machine 11 but rather is operable to control a multiplicity of electric motors as to speed and other operational parameters and which may be installed on a variety of different devices and related assemblies. The electric motors of the subject invention will be discussed in greater detail hereinafter.

The blending machine 11, upon which the apparatus of the subject invention operates, rests on a supporting surface 12, and includes a generally rectangular shaped frame 13 and which further includes a first end 14 and an opposite second end 15. The frame 13 is supported in spaced relationship relative to the supporting surface 12 by a plurality of leg members which are generally indicated by the numeral 16. The frame 13 includes a longitudinal line of reference which is designated by the line labeled 17. The plurality of leg members 16 include first, second, third and fourth legs 21, 22, 23 and 24, respectively; each of the legs having a first or earth engaging end 25 and an opposite, second, or upper end 26. A plurality of substantially horizontally disposed support members 30 are fixed as by welding or the like to the upper ends 26 of the individual leg members 21 through 24, respectively. The horizontal support members include first, second, third and fourth support members 31, 32, 33 and 34, respectively, each of the horizontal support members including a first end 35 and an opposite second end 36. Further, the individual horizontally disposed support members have a top surface 40 and an opposite bottom surface 41. A housing 40B is mounted on the outboard facing surface of the first and third support members. The housing shelters an electric conduit which electrically couples the individual electric motors to a controlling means. These assemblies will be discussed in greater detail hereinafter. Mounted in substantially parallel, spaced relation relative to the longitudinal line of reference 17 is a pair of longitudinally disposed support members 42. The support members, which include a first longitudinal support 43 and a second longitudinal support 44, each have opposite first and second ends 45 and 46 which are respectively fixed as by welding or some other suitable fastening technique, to the second and fourth horizontal support members 32 and 34, respectively. The first and second longitudinal support members have top and bottom surfaces 50 and 51 and a channel or space 52 is defined between the longitudinal support members. A supporting surface, such as a metal plate 53, is mounted on the top surface of the longitudinal support members 42, the supporting surface including a peripheral edge 54, and a side wall 55 extends at a substantially normal attitude upwardly therefrom and includes at its upper end a channel member which is generally indicated by the numeral 56. The operation of the channel member 56 will be discussed in greater detail hereinafter.

The blending machine 11 includes a plurality of bins or containers 60 which are operable to dispense a variety of particulate matter which may be blended into an end product (not shown) having a predetermined formula or composition. For the sake of brevity, one container shall be described in significant detail, it being understood that all of the containers are of substantially identical construction.

Figure 2:
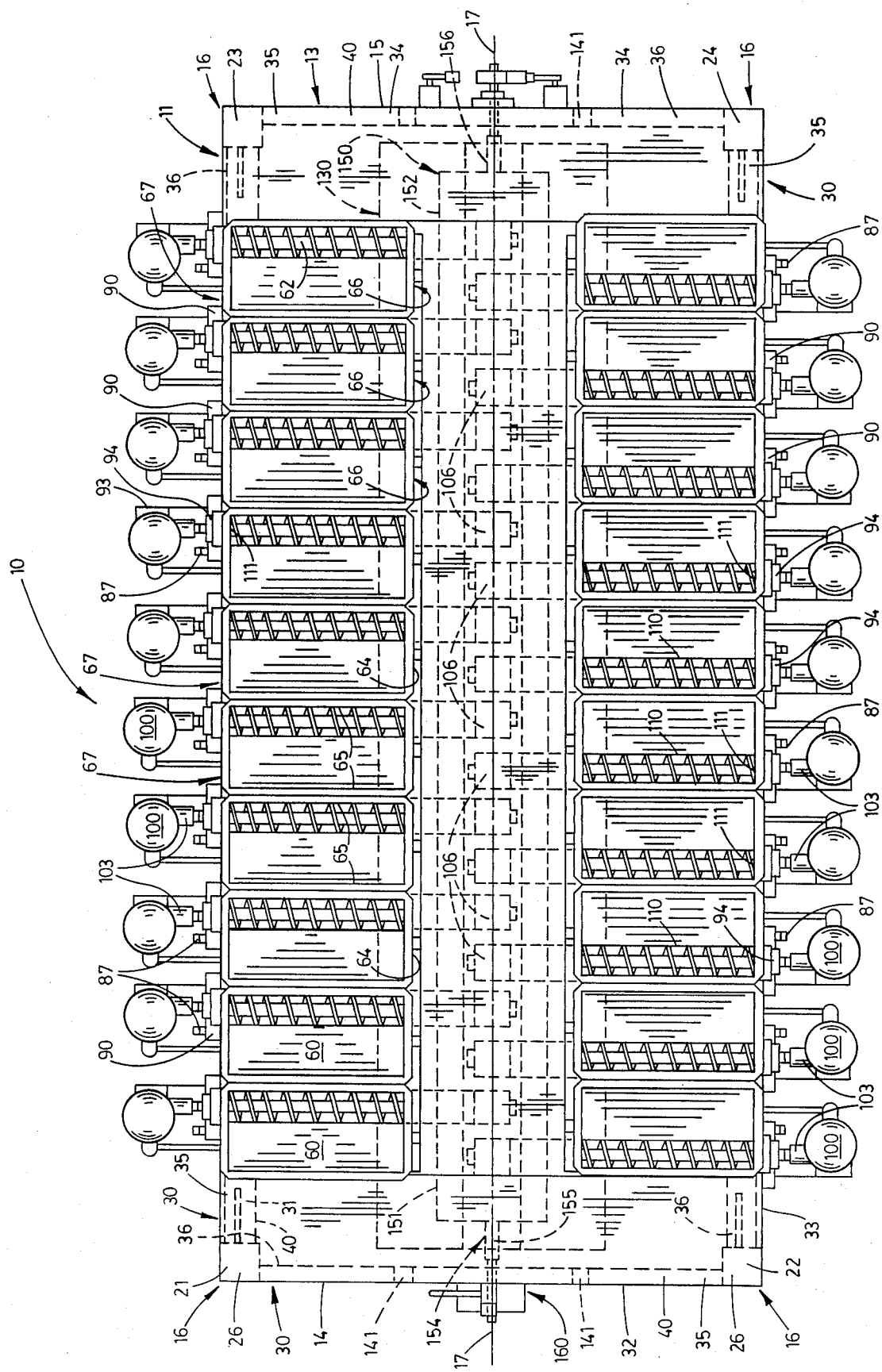
FIG. 2 is a plan view of the apparatus of the subject invention shown in FIG. 1 and taken from a position along line 2—2, with some supporting surfaces and structures removed to illustrate the structure thereunder.
Figure 3:
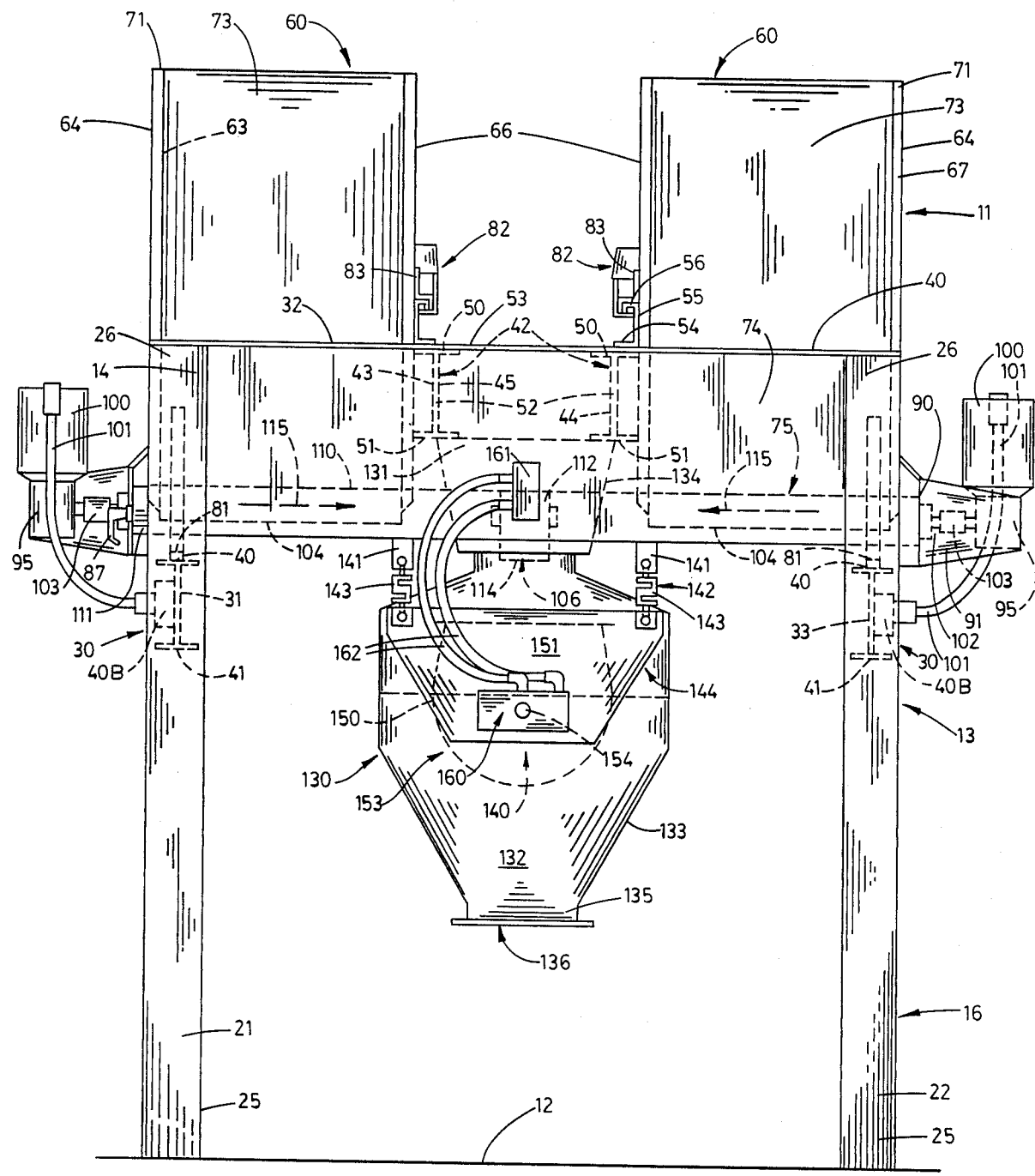
FIG. 3 is an end view of the apparatus of the subject invention taken from a position along line 3—3 of FIG. 1.

As best illustrated by reference to FIGS. 1, 2 and 3, the individual bins include a main body 61 having a substantially vertically disposed wall 62 which may be manufactured out of assorted different materials such as stainless steel, aluminum or other similarly rigid materials. The wall has an inside surface 63 and an opposite outside surface 64. The inside surface 63 defines a storage space 65 which is adapted to receive the materials to be dispensed (not shown). Further, the bins include an inboard facing surface 66 and an outboard facing surface 67. The wall 62 has a first or intake end 71 and an opposite, second, or discharge end 72. As best illustrated by reference to FIG. 1, the wall has a substantially uniformly dimensioned first portion 73 and an opposite, diminishing, second portion 74 which terminates in a discharge opening 75. The discharge opening 75 is disposed in communication with a screw conveyor which will be discussed in greater detail hereinafter.

Figure 4:
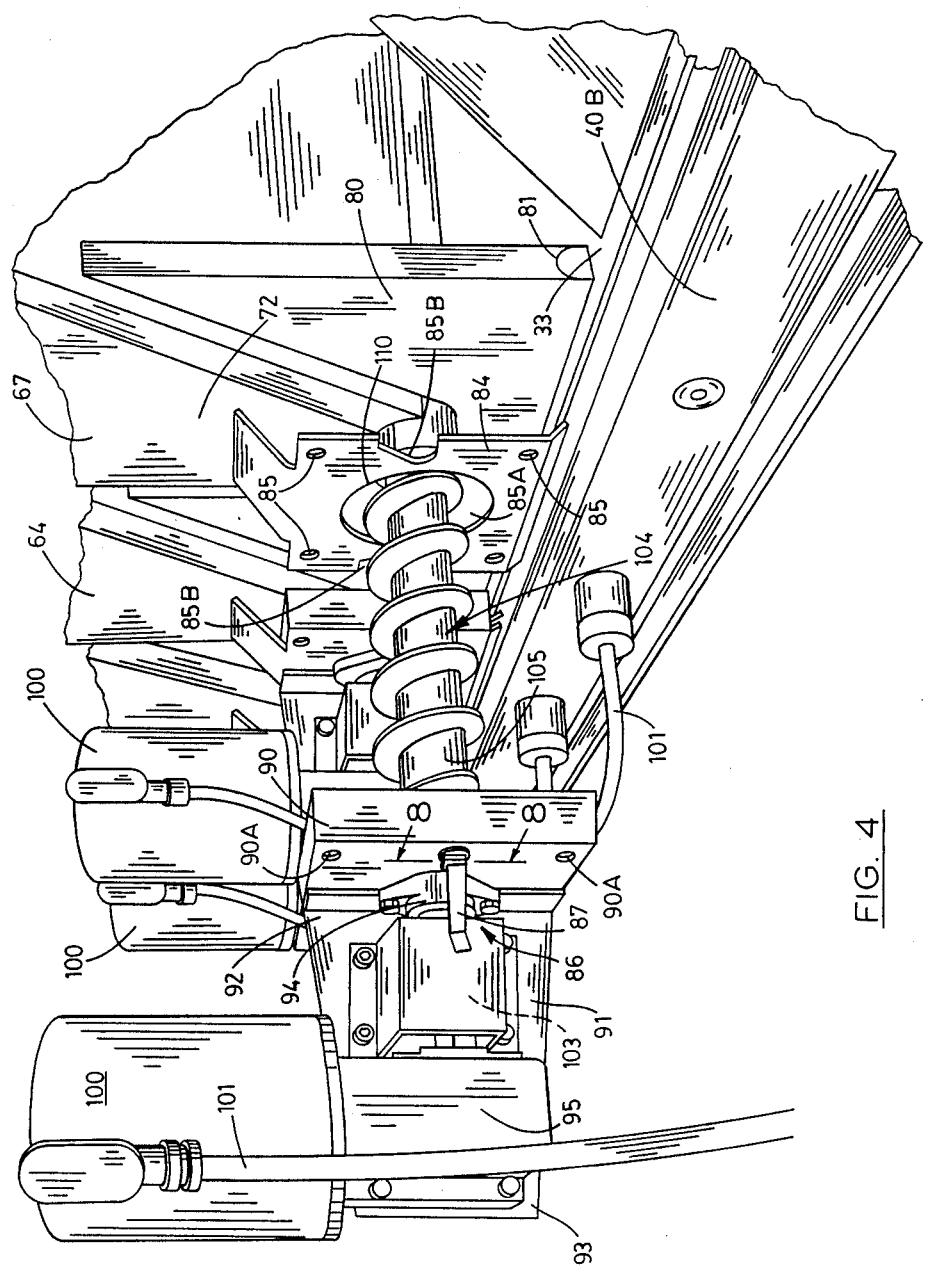
FIG. 4 is a fragmentary, perspective, exploded view of the apparatus of the subject invention as shown in FIG. 1 and illustrating a screw conveyor employed with the blending machine.

Each of the bins 60 include a substantially vertically disposed foot member 80 which is disposed in close proximity to the outboard facing surface 67 and which is mounted on the second or diminishing portion 74 of the wall 62. The foot has formed in its bottom surface a channel 81 which is adapted to mate with a related assembly (not shown). This channel is most clearly seen by reference to FIGS. 3 and 4, respectively. As best seen by reference to FIG. 3, the inboard facing surface 66 has fixed thereto a first latch assembly 82, and a complementary flange 83 is further mounted thereon and is operable to matingly engage the side wall 55 and the accompanying channel member 56 in the fashion as clearly illustrated in the drawings. The first latch assembly 82 is operable to engage the channel member 56 in such a fashion whereby the individual bins are securely but releasably fastened on the frame 13. As best seen by reference to FIGS. 3 and 4, the outboard facing surface 67 has fixed thereto by welding or the like a base member 84 which has formed therein a plurality of apertures 85 and a larger substantially centrally disposed aperture 85A. Further, a pair of notches 85B are formed in predetermined positions in the peripheral edge thereof. A substantially complementary support member 90 is adapted to releasably mate with the base member 84 and includes a plurality of apertures 90A which are adapted to be disposed in substantial registry with the plurality of apertures 85, and which are individually adapted to receive a plurality of threaded shafts (not shown). The threaded shafts hold these two elements together for shipment purposes.

Figure 9:
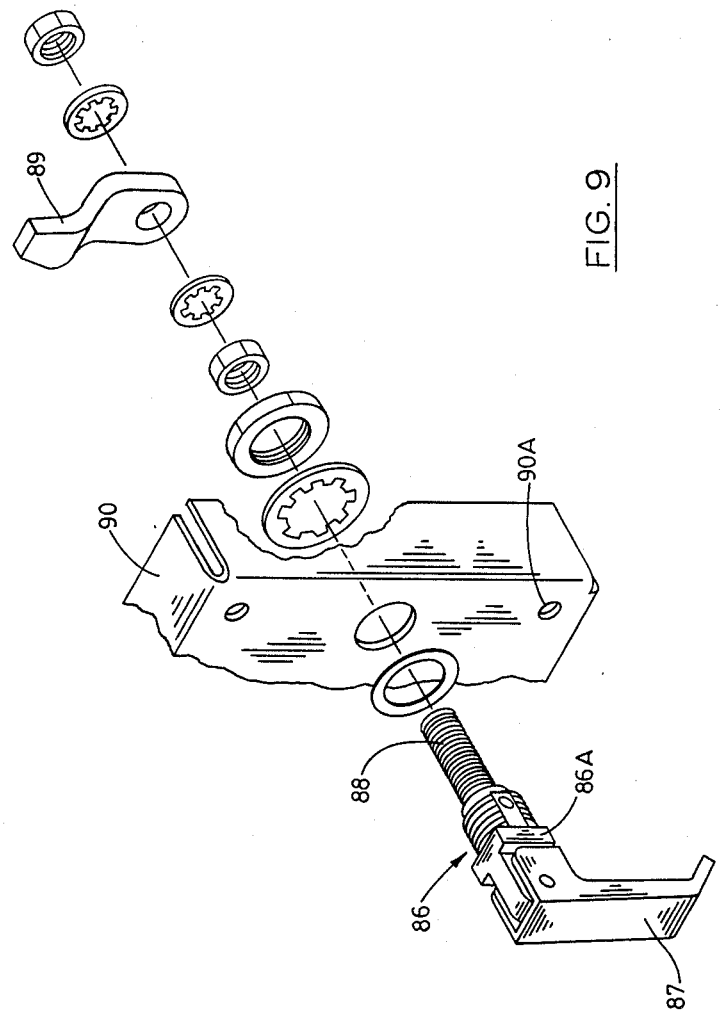
FIG. 9 is a perspective, fragmentary, exploded view of the latch assembly illustrated in FIG. 8.
Figure 8:
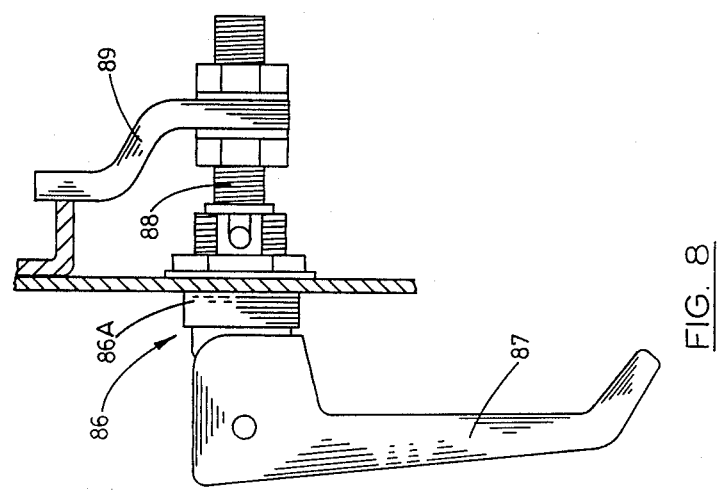
FIG. 8 is a somewhat enlarged, fragmentary, transverse vertical sectional view and which illustrates a latch assembly employed on the blending machine illustrated in FIG. 1.

The apparatus 10 provides a convenient means by which the associated screw conveyors may be conveniently and rapidly disassembled, or detachably released from, the frame 13 such that daily sanitary care, inspection, or maintenance may be performed thereto. The individual screw conveyors will be discussed in greater detail hereinafter. In this regard, and as best illustrated by references to FIGS. 4, 8 and 9, a second latch assembly 86 is shown and which is operable to releasably fix or join the complementary support member 90 in mating engagement with the supporting base member 84. The second latch assembly includes a threaded sleeve-like main body 86A which is fixed to the complementary support member by a conventional lock washer and mounting nut. Pivotally joined to the main body is a handle 87. The main body 86A supports for rotatable, and selective reciprocal longitudinal movement a threaded shaft 88 which is fixed to the handle 87. The threaded shaft is operable to mount a pawl 89 which is adapted to be slidably received through the individual notches 85B which are formed in the supporting base member 84. As should be understood, and by lifting up on the handle and thereafter rotating it in the counterclockwise direction, the pawl can be urged out of engagement with the supporting base member 84 thereby permitting the associated screw conveyor to be released from the frame 13. If the reverse procedure is performed and the handle is pushed down, the individual screw conveyors are securely fastened to the frame.

Mounted on the complementary support member 90 is a secondary support member 91 which is disposed in a position substantially normally thereto and which includes a first end 92 which is fixed, as by welding, to the complementary support member 90 and which has an opposite, or second end 93 which is remote thereto. As best seen by reference to FIG. 3, a bearing assembly 94 is mounted on the complementary support member 90 and, further, a gear reduction assembly 95 is fixed on the support member 91 by suitable fasteners such as bolts or the like. The apparatus 10 of the subject invention includes a plurality of electric motors 100 which are supported on the individual support members 91 by individual gear reduction assemblies 95 which are affixed thereto. As best illustrated by reference to FIG. 3, a drive shaft 102 is rotatably borne by the gear reduction unit and is supported for rotational movement by the bearing assembly 94. Mounted on the drive shaft 102 is a motor coupler assembly 103. As best illustrated by reference to FIG. 4, the drive shaft 102 is mounted in driving relation relative to a screw conveyor 104 of substantially conventional design. The screw conveyor 104 includes a first or proximal end 105 and a second or distal end 106. As best illustrated by reference to FIGS. 1 and 2, a feed tube 110 is made integral with the individual bins 60 and is adapted to partially enclose the individual screw conveyors 104, thereby providing a passageway for the movement of material from the individual bins 60 to a weigh hopper which will be discussed in greater detail hereinafter. The tube 110 has a proximal end 111 which is fixed to the supporting base member 84, and a distal end 112 which provides a surface which supports a bearing assembly 113. The bearing assembly 113 rotatably receives and supports the second end 106 of the screw conveyor 104. Further, and as best illustrated by reference to FIGS. 2 and 3, a discharge opening 114 is formed in the distal end 112 and which permits material urged along by the screw conveyor to move, under the influence of gravity, into a weigh hopper which will be discussed in greater detail hereinafter. The individual tubes 110 define paths of travel 115 which are disposed in attitudes substantially transversely relative to the longitudinal line of reference 17. Further, and as best illustrated by reference to FIG. 2, the discharge openings are disposed substantially along the longitudinal line of reference 17 and are further disposed in substantial registry with the channel 52 which is defined between the first and second longitudinal support members 43 and 44, respectively.

A shroud, which is generally indicated by the numeral 130, is manufactured out of a suitable rigid material such as stainless steel or the like, and has an upper portion 131 and an opposite lower portion 132. The shroud has a wall 133 having an upper end 134 which is fixed to the bottom surface 51 of the first and second longitudinal support members 43 and 44, respectively. This is best illustrated by reference to FIG. 3. The lower end 135 of the wall 133 defines a discharge opening which is generally indicated by the numeral 136. As best seen by reference to FIGS. 1 and 2, a weigh hopper assembly and which is generally indicated by the numeral 140 is positioned in communication with the discharge openings 114 of the individual tubes 110 and which rotatably support the individual screw conveyors 104. The weigh hopper assembly is suspended from the second and fourth horizontal support members 32 and 34, respectively, by a pair of support members which are generally indicated by the numeral 141. The support members have affixed thereto individual load cells 142 which are operable to provide a suitable signalling means to indicate a change in the relative weight of the weigh hopper assembly. The individual load cells 142 have a substantially S-shaped main body 143 and are further attached to individual support plates which are generally indicated by the numeral 144. The support plates include a first support plate 145 and second support plate 146.

A weigh hopper 150 is rotatably mounted on the first and second support plates 145 and 146, respectively. The weigh hopper has a first end 151 and an opposite second end 152. The weigh hopper has a cup-shaped main body 153 which, when properly positioned, is disposed in communication with the discharge openings 114 of the individual tubes 110. Thus, it should be readily recognized that material exiting under the influence of gravity would be received in the cup-shaped main body 153. An axle assembly 154 including a first portion 155, and a second portion 156, are mounted on the first and second ends of the weigh hopper and extend substantially longitudinally outwardly relative thereto and are rotatably received and supported in appropriate bearing assemblies (not shown) and which are mounted on the first and second plates 145 and 146. As should be understood, the first and second portions 155 and 156 are also received through an aperture formed in the shroud assembly 130. However, it should be understood that the shroud assembly is firmly fixed to the frame 13 and does not rest on or support the individual portions of the axle assembly 154. The first portion 155 of the axle assembly 154 is received in a suitable drive assembly 160 which is mounted on the first support plate 145. The drive assembly is operable to rotate the weigh hopper 150 upside down such that it will dump whatever material is received in the weigh hopper and wherein the materials once dumped may exit through the discharge opening 136 which is defined by the shroud 130 and where the materials can be received in another receptacle (not shown) for movement to a remote location. As best seen by reference to FIG. 3, a solenoid control 161 is mounted on the frame 13 and a pair of electrical leads 162 connect the solenoid control to the drive assembly 160.

Figure 5:
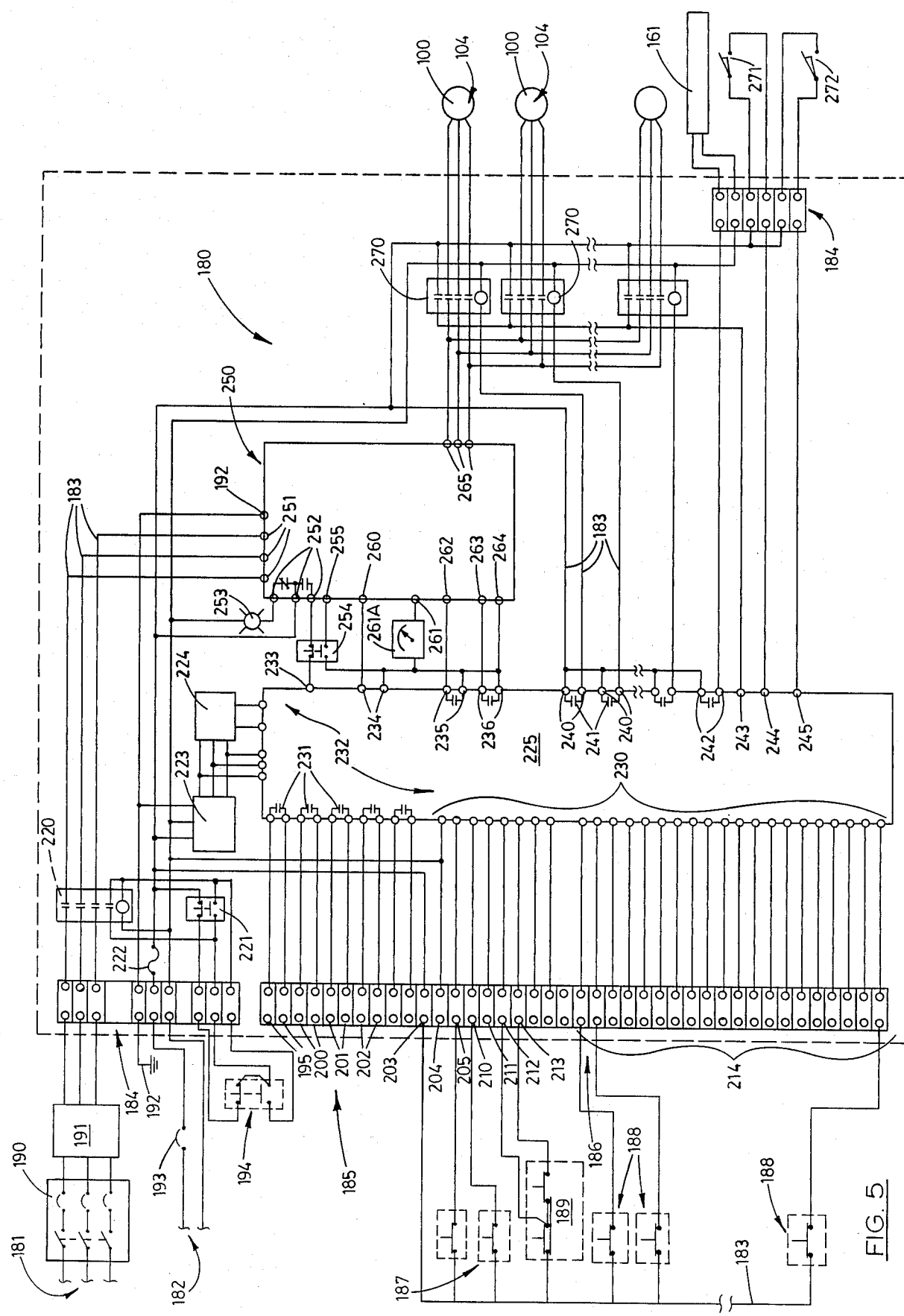
FIG. 5 is a schematic/block diagram showing the apparatus of the subject invention.
Figure 7:
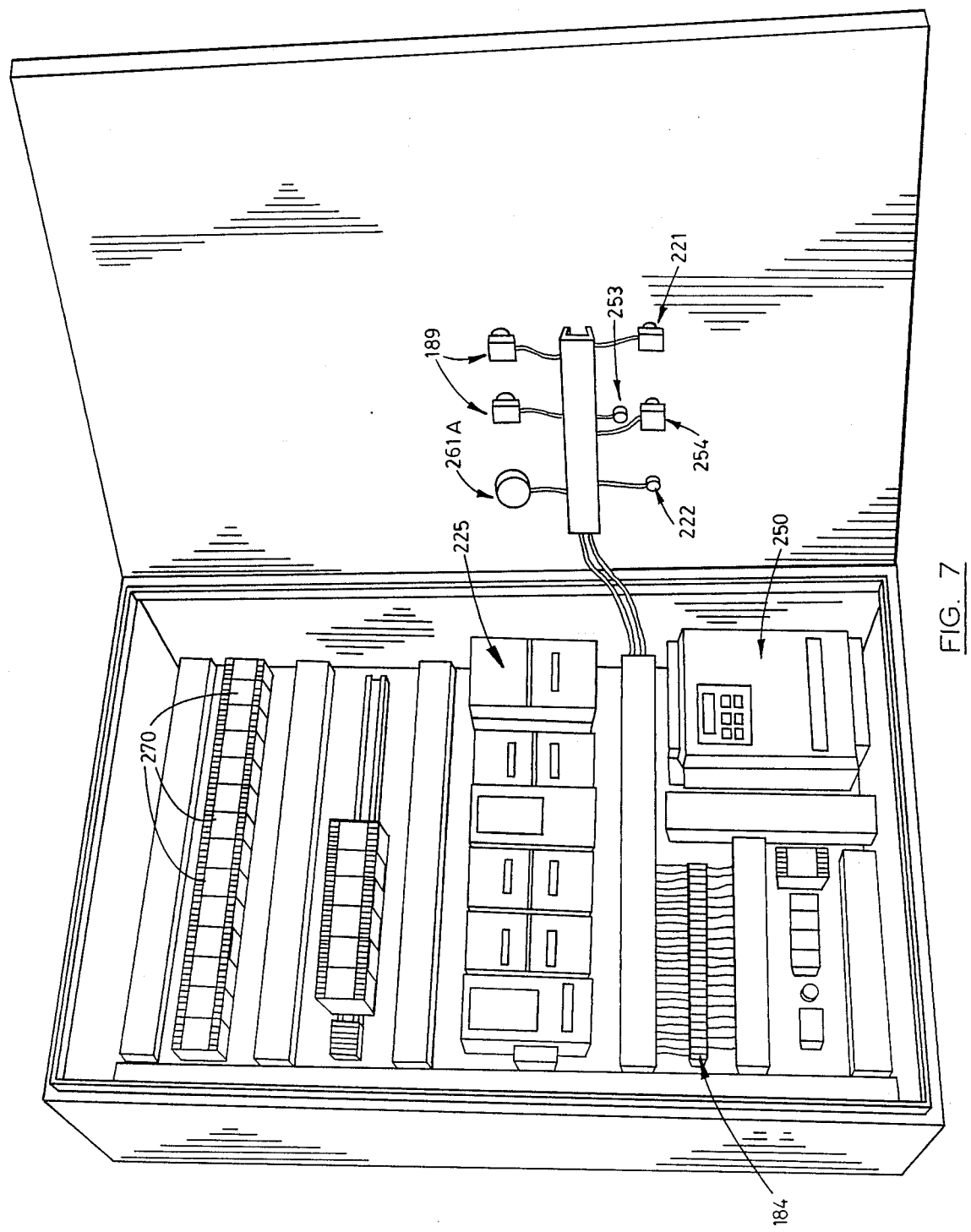
FIG. 7 is a perspective view of a control panel mounting the various electrical components which make up the subject invention.

As best illustrated by reference to FIGS. 5 and 7, a controller means or assembly, and which is generally indicated by the numeral 180, is electrically coupled with the individual electric motors 100. The controller means 180 is connected with a source of 480 volt AC 60 Hz 3 phase power 181 which is supplied to an isolation transformer and which provides 230 volt 3 phase power to the controller assembly 180. Further, a source of 120 volt AC 60 Hz power 182 is also supplied to same. The controller assembly includes a plurality of electrical conductors 183. In addition to the foregoing, the controller assembly 180 includes a terminal strip 184 which has an output portion 185 and a corresponding input portion 186. The controller assembly also includes a means for individually actuating each of the electric motors; and a selection means is electrically coupled with the actuation means and is adapted to generate predetermined signals which are adapted to place the selected electric motor in predetermined high speed, low speed or deactivated states. In the present embodiment of the subject invention, the selection means and the actuation means includes first and second electrical switches 187 and 188, respectively. As should be understood, the first electrical switch 187 works in combination with the second electrical switch 188 to provide the means for selecting the predetermined high speed/slow speed and on/off, respectively. Further, the second electrical switch is adapted to provide, by itself, the means for selecting the individual electric motor to be actuated. A third electrical switch 189 which is a combination key lock, speed change enable switch operates to provide an adjustment means for selectively adjusting the speed of the electric motor selected and wherein the speed selected by the adjustment means is thereafter stored in the memory of a programmable controller for future use. The function of the programmable controller will be discussed in further detail hereinafter.

It should be understood that the selection and actuation means are normally positioned in physical locations external to the blending machine 11 and may include manually actuatable electrical switches, or alternatively, a single, combined, manually operated switch, or still further may include a computer (CPU) which is programmable for providing the desired selections. Such a commercially available computer is manufactured by Wisconsin Electrical Manufacturing Company under the trademark "WEM ®." The computer is adapted to control a plurality of devices which may be employed in a conventional batching system.

Electrically coupled with the source of 480 volt AC, 60 Hz, 3 phase power 181 is a lockable disconnect switch assembly 190 and which has a 10 amp 3 phase circuit breaker which is made integral therewith. This lockable disconnect switch 190 is further electrically coupled with an isolation transformer 191 of conventional design and which is adapted to receive the 480 volt AC 3 phase power and reduce it to 230 volt 3 phase AC. The controller means includes a ground 192, and a 10 amp circuit breaker 193 is electrically coupled to the source of 120 volt AC, 60 Hz power 182. The apparatus 10 of the present invention includes an optional, remote, start and stop switch 194 which is shown in phantom lines in FIG. 5. This switch permits the apparatus 10 of the subject invention to be stopped from a remote control room, for example. The output portion 185 of the terminal strip 184 includes a pair of terminals 195 which provide an output signal which indicates that the apparatus 10 is active. Further, a pair of adjoining terminals 200 provide an output signal which indicates that the apparatus 10 does not have an electrical fault. In addition, the terminal strip includes a pair of terminals 201 and 202, respectively, which provide output information which indicates whether the weigh hopper 150 is in an "up position" such that it is appropriately located relative to the discharge ends 106 of the individual screw conveyors 104 to receive the materials from the individual bins or containers 60; and a "down position" whereby it is not disposed in receiving relationship therewith.

Adjoining the terminals 201 and 202 are input terminals 203 and 204, respectively, which include the 120 volt AC common line and 120 volt AC neutral line, respectively. As should be understood by a study of FIG. 5, and when one of the second electrical switches 188 is placed in a closed position, power is received from the 120 volt AC common line and is supplied to the terminal strip 184 for actuating the electric motor which is coupled to 180. Further, an input terminal 205 is adapted to provide an input signal which is adapted to role the weigh hopper 150 from the "up position," whereby it is in a predetermined location in receiving relationship relative to the discharge ends 106 of the individual screw conveyors 104, to the "down position," whereby it will dump whatever materials are received therein. Further, an adjoining terminal 210 provides a means for receiving an input signal to slow the selected electric motor speed and terminals 211, 212 and 213 are adapted to provide a means for receiving input signals to reverse the direction of rotational movement of the individual electric motors and to increase or decrease the speed settings of the selected electric motor, respectively. As best illustrated by reference to FIG. 5, the first electrical switch 187 is electrically coupled to terminal 210, and as earlier discussed, is operable to work in combination with the second electrical switch 188 to provide a selection means for driving the selected electrical motor at predetermined speeds. More particularly, and when the first electrical switch 187 is in the open position, and when one of the second electrical switches 188 is in a closed position, the programmable controller is adapted to receive a signalling sequence which indicates that the selected electric motor should be driven at a predetermined high speed value. Alternatively, and when the first electrical switch 187, and the selected second electrical switch are both placed in a closed position, the programmable controller receives a signalling sequence which indicates that the selected electric motor 100 should be driven at a predetermined slow speed value. In this manner, the first electrical switch 187 working in combination with one of the second electrical switches 188 provides a selection means, and the first electrical switch, operating by itself, provides an actuating means. The programmable controller will be discussed in greater detail hereinafter. The individual input terminals 214 provide a means for receiving input signals to select the individual electric motors 100. As best seen in FIG. 5, the individual second electrical switches 188 are each electrically coupled with the individual terminals 214. The terminals 214 include 20 input locations to provide a means for individually actuating each of the 20 electric motors which are made integral with the subject invention.

The controller assembly 180 includes a contactor assembly 220, and a start/stop switch 221, both of which are electrically coupled with the remote start/stop switch 194. As best indicated by reference to FIG. 5, a 4 amp fuse 222 and a noise and spike suppressor 223, as well as a 24 volt DC power supply 224 are electrically coupled with the source of 120 volt AC power 182. Electrically coupled with the 24 volt DC power supply 224 and disposed in signal receiving relationship relative to the terminal strip 184 is a programmable controller 225. A commercially available programmable controller is manufactured by the Square D Company under the trademark "SY/MAX ®" Model 50 programmable controller. The programmable controller is adapted to perform ladder logic and other computing functions such as adding, subtracting, multiplying, dividing, BCD-to-binary conversion, binary-to-BCD conversion and numerical comparison and which allows complex control of other devices to be performed through the programming of same. Further, the commercially available Model 50 permits multiple functions to be performed which meet various control requirements such as reversible counters, bi-directional shift registers, timer/counters, etc. Further, a programmable controller device such as that described above can be easily linked to a personal computer for programming and control functions. However, it should be readily understood that the programmable controller could be easily replaced by electromechanical subassemblies including a plurality of switching assemblies such as relays and potentiometers and which could be designed to perform the substantially identical function. Therefore, the apparatus of the subject invention is not limited to a programmable controller such as that illustrated herein but would include such similar electromechanical subassemblies such as the array of potentiometers and relays described above and wherein the potentiometers are set to the various speed values required for the individual electric motors 100. The operation of the programmable controller 225 will be discussed in paragraphs which follow.

The programmable controller 225 includes a plurality of inputs and which are generally indicated by the numeral 230. Further, and as illustrated in FIG. 5, a plurality of output signal contacts 231 are made integral with the programmable controller 225 and are individually electrically coupled to the various inputs. The programmable controller further includes a plurality of inputs 232; these individual outputs including a no drive fault input 233, and a 4-20 ma speed control signal output which is generally indicated by the numeral 234. In addition, the programmable controller 225 includes a pair of output terminals 235 which provide an output signal which is adapted to actuate a single variable speed motor drive to drive a selected electric motor 100 in a predetermined forward direction; and a pair of electrical output terminals 236 provide a signal to drive the selected electric motor 100 in a reverse direction. The variable speed motor drive will be discussed in detail hereinafter. In addition, pairs of terminals 240 provide output signals for the individual electric motors 100, the individual pairs of terminals corresponding to the 20 electric motors 100 which are made integral with the apparatus 10. As should be readily apparent the subject apparatus may include any number of electric motors depending upon the end use of the device. In addition, the programmable controller includes a pair of terminals 242 which electrically couple the programmable controller 225 to the weigh hopper solenoid valve 161 and which is adapted to roll the weigh hopper upside down to empty its contents. An input terminal 243 is adapted to provide means by which the programmable controller can verify that at least one of the several contactor assemblies is in a closed position thereby connecting a load to the variable speed motor drive. The contactor assemblies will be discussed hereinafter. In addition, the programmable controller 225 has terminals 244 and 245 which are adapted to receive information which indicates that the weigh hopper 150 is in the up or fill position, or in the down or emptying position. As best illustrated by reference to FIG. 6, the programable controller includes a memory which stores a computer program which renders it operable to achieve the benefits which will be summarized in the paragraphs which follow. Further, the memory of the programmable controller stores high and low speed motor values for each of the electric motors which are made integral with apparatus 10 as well as other operational parameters as will be discussed hereinafter.

A variable speed motor drive is generally indicated by the numeral 250 and is best illustrated by reference to FIG. 7. A commercially available variable speed motor drive is manufactured by the Eaton Corporation of Kenosha, Wis. under the trade name "Dynamatic Model AF-1500 Adjustable Frequency AC Drive." The variable speed motor drive is adapted to provide adjustable speed control for three phase electric motors. The adjustable frequency AC drive is a microprocessor based pulse width modulated (PWM) drive having features which can be programmed to tailor the drive's performance to a wide variety of applications utilizing AC electric motors. Other drives are also suitable for this application and may include DC variable speed motors and related drives. The variable speed motor drive 250 has a plurality of inputs which include three inputs 251 for the source of 230 volt AC 3 phase power. Inputs 251 include line 1, line 2, line 3 and the ground 192. Further, the variable speed motor drive includes outputs which are generally indicated by the numeral 252. Electrically coupled between the outputs 252 and the source of 120 volt AC power 182 is a warning light 253 which provides a fault light in the event of failure. Electrically coupled between the programmable controller 225 and the variable speed motor drive 250 is a reset switch 254 and which is also shown in FIG. 7. Further, the variable speed motor drive includes a speed signal input terminal 260 and a frequency output terminal 261. A frequency meter 261A is electrically coupled therewith. In addition to the foregoing, the variable speed motor drive includes inputs which receive the forward drive signal 262 generated by the programmable controller as well as the motor reverse signal 263 which may be produced by the programmable controller from time to time. A common terminal 264 is also provided on the variable speed motor drive 250. The variable speed motor drive 250 includes output terminals 265 which are electrically coupled with a plurality of individual contactor assemblies 270 and which are further electrically coupled with the individual electric motors 100 to selectively couple them in signal receiving relationship relative to the variable speed motor drive 250. In addition to the foregoing, a weigh hopper full position limit switch 271 and a weigh hopper empty position limit switch 272 are electrically coupled with the controller assembly 180 whereby the relative position and operation of the weigh hopper 150 may be precisely controlled.

OPERATION

The operation of the preferred embodiment of the present invention is believed to be readily apparent and is briefly summarized at this point.

As should be understood, the programmable controller 225 has a memory which is adapted to be programmed to store high and low speed values or other predetermined speed values for the individual electric motors 100 which are selected. As earlier discussed, the first electrical switch 187 acting in combination with the second electrical switch 188 is adapted to generate predetermined signals which are operable to place the selected electric motor in a high speed, low speed or deactivated state. To place a selected electrical motor 100 in a high speed condition, an operator would close the second electrical switch 188 for the desired electrical motor and would leave the first electrical switch in an open position. In the alternative, and if the slow speed was desired, the first electrical switch would be closed. The high and low speed values are selected based upon the application need. It should be understood that the high speed value is selected such that the individual electric motor selected can be driven at a high speed to urge the individual screw conveyors 104 to move a large percentage of the material from the individual bins 6 into the weigh hopper 150. The individual load cells 142, in response to this transfer of material, would transmit a signal to an operator (not shown), and which would indicate the weight of material delivered to the weigh hopper. At a predetermined point, the operator can move the first electrical switch 187 to the closed position such that the affected screw conveyor 104 may then slowly move material into the weigh hopper in a fashion whereby a high degree of accuracy may be achieved. Upon receiving a conveyor start signal or actuation signal from the terminal strip 184, the programmable controller 225 is adapted to close the individual contactor assembly 270 which connects the selected electric motor 100 to the variable speed drive 250. Once the contactor assembly has been closed, the programmable controller receives a signal through the contactor engaged input 243 that such an event has occurred. This feature is provided to ensure that a load is constantly attached to the variable speed motor drive 250 thereby preventing damage thereto. Upon receiving a signal that a contactor assembly is closed, the programmable controller 225 is adapted to provide a signalling sequence which corresponds to the positions of the first and second electrical switches 187 and 188, respectively. The appropriate speed signal is thereafter retrieved from memory relative to the selected motor and a 4-20 ma speed control signal is transmitted through the speed control signal output terminals 234 and is received at the input terminal 260 of the variable speed motor drive 250. Upon receiving the selected speed control signal and a drive forward or reverse signal, the variable speed motor drive is adapted to drive the selected electric motor 100 and its related screw conveyor in the fashion as provided by the selected speed control signal and the accompanying forward or reverse signal.

When the second electrical switch 188 is put in a deactivated, open or off position, the programmable controller 225 is adapted sequentially to turn off the variable forward speed motor drive 250 by means of terminating the drive forward signal, pause for approximately one (1) second, and then open the affected contactor assembly 270 which is electrically coupled to the selected electrical motor 100. In this fashion, and since the motor comes to rest, the variable speed motor drive 250 is electrically protected or otherwise isolated from any electrical current which may be generated as a result of the residual movement of the electrical motor following its deenergization.

As earlier discussed, the apparatus 10 of the subject invention includes weigh hopper limit switches 271 and 272 respectively which provides a means for controlling the rotational movement of the weigh hopper 150 from an up or fill position whereby it is disposed in receiving relationship relative to the discharge end of each of the screw conveyors 104 to a down or empty position whereby it is rotated substantially upside down such that it empties whatever materials are supplied to the weigh hopper. As should be understood by a study of FIGS. 5 and 6, the programmable controller, by means of its programming, is adapted to ensure that the weigh hopper is in appropriate up or fill position prior to activating the individual electric motors 100 which drive each of the screw conveyor.

Figure 6:
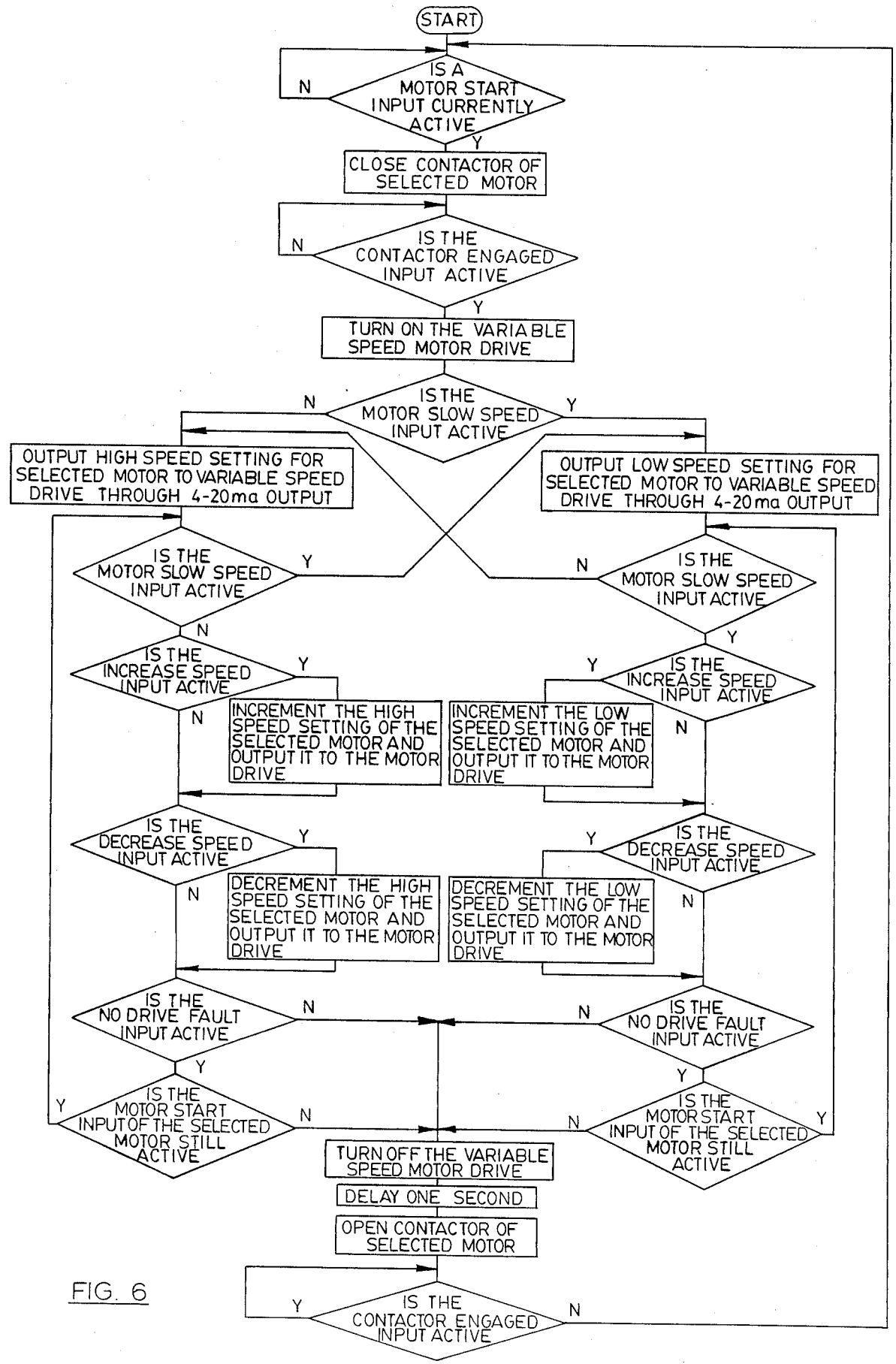
FIG. 6 is a flow chart of a computer program which coordinates the operation of the apparatus of the subject invention shown in FIG. 5.

As best seen by reference to FIG. 6, a flow chart of a computer program is provided and which illustrates the manner in which the programmable controller processes input information such that it may sequentially control the actuation of the individual electric motors 100 in accordance with the signals received from the first, second and third electrical switches 187, 188 and 189, respectively, as well as signals received from the individual contactor assemblies 270 and the weigh hopper limit switches 271 and 272, respectively.

As should be readily apparent by a study of the specification provided herewith, the apparatus 10 for selectively controlling a plurality of electric motors 100 for driving individual work objects achieves operational efficiency by employing predetermined programmed speed values which provide a means whereby the apparatus can drive a plurality of screw conveyors 104 in an advantageous fashion such that the materials to be blended may be combined efficiently and quickly and in a manner not possible heretofore. Further, the apparatus of the subject invention is adapted to minimize the costs related to blending such materials in terms of minimizing the amount of labor necessary to blend a predetermined volume of materials, as well as minimizing the amount of maintenance time necessary to service devices which may incorporate the subject matter of the invention as an integral assembly thereof. Moreover, the apparatus 10 of the subject invention is versatile inasmuch as it provides safety features which protect individual subassemblies such as the variable speed motor drive 250 from damage which might otherwise occur in the event that such safety features were not employed. In addition to the foregoing, the apparatus achieves an additional laudable benefit by providing a means wherein a unitary variable speed motor drive can be employed to selectively control a plurality of electric motors, as to speed, in a highly advantageous fashion and wherein it appears that each electric motor has its own variable speed motor drive, when in fact one variable speed motor drive services all the electric motors employed.

Therefore, the apparatus for selectively controlling a plurality of electric motors 100 for driving individual work objects can be employed in a wide variety of operative environments, can be manufactured and purchased at moderate cost when compared with related prior art devices, is highly efficient in operation and is compact thereby facilitating installation and maintenance, and which further reduces to an absolute minimum the problems associated with many of the prior art devices which are designed for substantially identical purposes.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by letters patent is:

1. An apparatus for selectively controlling a plurality of electric motors for driving individual work objects, comprising:

means for selecting individual electric motors which includes a first electric switch and a second electric switch, and wherein the second electric switch selects the electric motor to be actuated, and wherein the first and second electric switches acting in various combinations provide signals which vary the speed of the electric motor selected, and which provide on/off control for the electric motor selected;

signal generating means coupled to the selecting means for generating a predetermined signalling sequence in response to the selection of an individual electric motor, the signal generating means coupled with each of the electric motors;

a variable speed motor drive coupled with the signal generating means and with each of the electric motors, the variable speed motor drive selectively driving the individual electric motors at predetermined speeds in response to the signalling sequence received from the signal generating means; and means coupled with the selecting means for sensing the work performed by each of the work objects whereby an operator manually moves the first switch to selected positions in response to information produced by the sensing means to vary the speed of the electric motor selected.

2. An apparatus as claimed in claim 1 wherein the signal generating means includes a programmable controller having a memory which stores predetermined speed values for each of the electric motors, and wherein a plurality of contactor assemblies are individually electrically coupled to the programmable controller and to each of the electric motors, and wherein the programmable controller is operable to open and close selective contactor assemblies thereby selectively coupling individual electric motors to the variable speed motor drive.

3. An apparatus as claimed in claim 2 wherein the programmable controller is operable to close a contactor assembly prior to transmitting the signalling sequence to the variable speed motor drive, and wherein the programmable controller is operable to ascertain the position of an object of interest which operates in combination with the individual work objects prior to transmitting the signalling sequence to the variable speed motor drive.

4. An apparatus as claimed in claim 3 wherein the apparatus is a blending machine for combining a plurality of different materials, and wherein the object of interest is a weigh hopper, and wherein the individual work objects are a plurality of screw conveyors which are releasably mounted on the blending machine by a latch assembly, and wherein the blending machine includes a plurality of releasable containers which are operable to dispense the individual materials to be combined, the individual containers mounted in dispensing communication relative to the individual screw conveyors, and wherein the weigh hopper is disposed in receiving relation relative to the individual screw conveyors prior to the programmable controller transmitting the signalling sequence to the variable speed motor drive.

5. An apparatus as claimed in claim 4 wherein the sensing means senses the weight of materials received from the individual screw conveyors, and wherein the first electric switch when placed in an open position causes the programmable controller to retrieve from the memory a first predetermined speed value for the electric motor selected, and wherein the first speed value is transmitted to the variable speed motor drive, and wherein the first electric switch when placed in a closed position causes the programmable controller to retrieve from the memory a second predetermined speed value for the electric motor selected, and wherein the second predetermined speed value is transmitted to the variable speed motor drive, and wherein the second electric switch when placed in an open position causes the programmable controller sequentially to deactivate the variable speed motor drive and then open the contactor assembly which is coupled to the electric motor selected thereby electrically isolating the electric motor from the variable speed motor drive.

6. An apparatus as claimed in claim 5 wherein the selecting means further includes a means for adjusting the speed of the electric motor selected, and wherein the speed selected by the adjustment means is stored in the memory of the programmable control for future use.

7. In a machine for blending a plurality of materials into an end product and wherein the machine includes a weigh hopper, a plurality of containers which individually dispense the materials to be combined, and a plurality of conveyors individually are positioned in dispensing communication relative to each of the containers to carry each of the materials to the weigh hopper, an apparatus for selectively actuating a plurality of electric motors which are made integral with the machine for driving the individual conveyors, comprising:

means for selecting individual electric motors, the selecting means coupled in signal transmitting relation relative to the machine and further producing signals which vary the speed of the electric motor selected;

programming means coupled with the selecting means and programmable for generating a predetermined signalling sequence in response to the signals generated by the selecting means, the programming means electrically coupled with the individual electric motors;

a variable speed motor drive borne by the machine and electrically coupled with the programming means and with the individual electric motors, and wherein the variable speed motor drive selectively drives the individual electric motors at predetermined speeds in response to the signalling sequence of the programming means;

a plurality of contactor assemblies individually and electrically coupled with each of the electric motors and with the programming means, and the variable speed motor drive, and wherein the individual contactor assemblies, when closed, are operable to electrically couple the individual electric motors with the variable speed motor drive, and when open, electrically isolating the individual electric motors from the variable speed motor drive; and means for sensing the weight of materials delivered to the weigh hopper by the individual conveyors wherein the selecting means is selectively adjusted to control the rapid and precise delivery of materials into the weigh hopper to form an end product having a predetermined composition.

8. In a machine as claimed in claim 7 wherein the selecting means includes a first electrical switch and a second electrical switch, and wherein the second electrical switch is operable to select an individual electric motor to be actuated, and wherein the first and second electrical switches, acting in combination, are adapted to provide the signals which vary the speed of the electric motor selected, and wherein the programming means is operable, upon receiving the signals actuating one of the electric motors, to verify that at least one contactor assembly is in a closed position, and that the weigh hopper is in a predetermined position, prior to transmitting the signalling sequence to the variable speed motor drive thereby actuating the selected electrical motor.

9. In a machine as claimed in claim 8 wherein the first electrical switch when placed in an open position causes the programming means to retrieve from memory a first speed value for the electric motor selected, and wherein the first speed value is provided to the variable speed motor drive whereby the variable speed motor drive drives the selected electric motor at a high speed to move the majority of material to be blended into the weigh hopper, and wherein the movement of the first electrical switch to a closed position causes the programming means to retrieve from the memory a second speed value for the selected electric motor and provide a slow speed signal to the variable speed motor drive such that the remainder of the material to be dispensed to the weigh hopper may be precisely metered to the weigh hopper at said lower speed thereby achieving increased accuracy.

10. In a machine as claimed in claim 9 wherein the positioning of the second electrical switch in an open position causes the programming means to substantially, sequentially, deactivate the variable speed motor drive, and then electrically isolate the electric motor being driven by opening the closed contactor assembly which electrically couples the previously selected electric motor to the variable speed motor drive such that the variable speed motor drive is protected from damage caused by electrical current generated by the electric motor.

11. In a machine as claimed in claim 10 wherein the programming means includes a CPU and the variable speed motor drive is an adjustable frequency AC drive.

12. An apparatus for selectively blending a plurality of materials, comprising:
- a frame having opposite first and second ends and a longitudinal line of reference;
- a plurality of dispensing containers releasably mounted on the frame and disposed in a discrete pattern on opposite sides of the line of reference, each of the containers operable to hold and dispense the individual materials;
- a plurality of screw conveyors releasably mounted on the frame and individually positioned in dispensing communication with each of the dispensing containers, the individual screw conveyors having a discharge end, and adapted to move the materials to be blended along predetermined paths of travel;
- a plurality of electric motors borne by the frame and individually disposed in driving relation relative to each of the screw conveyors;
- a weigh hopper rotatably mounted on the frame at the first and second ends thereof and positioned in receiving relation relative to the discharge ends of the individual screw conveyors;
- means borne by the frame for rotatably driving the weigh hopper from a first receiving position to a second dumping position;
- means coupled to the individual electric motors for selectively actuating the individual electric motors;
- means coupled to the electric motors and coupled with the actuating means for selectively generating predetermined signals which are adapted to vary the speed of the electric motor selectively actuated;
- a programmable controller disposed in signal receiving relation relative to the signal generating means and electrically coupled with each of the electric motors and with the actuating means, the programmable controller having predetermined stored speed values for each of the electric motors, and producing a predetermined signalling sequence in response to the signals received from the signal generating means;
- a variable speed motor drive disposed in signal receiving relation relative to the programmable controller and operable to selectively drive the individual electric motors in response to the signalling sequence received from the programmable controller;
- a plurality of contactor assemblies individually electrically coupled to each of the electric motors and disposed in signal receiving relation relative to the variable speed motor drive and with the programmable controller; and
- means for sensing the weight of the materials delivered to the weigh hopper and borne by the frame whereby the signal generating means is selectively adjusted to control the speed of the electric motor selectively actuated thereby rapidly and precisely delivering the individual materials to the weigh hopper to form an end product having a predetermined formulation.

13. An apparatus as claimed in claim 12 wherein the individual containers are mounted in two rows which are individually disposed on the opposite sides of the frame, and wherein the individual containers are adapted to gravitationally feed the materials to each of the screw conveyors, and wherein the paths of travel are substantially horizontally disposed and oriented substantially transversely relative to the frame, and wherein the discharge ends of the individual screw conveyors are positioned substantially along the longitudinal line of reference.

14. An apparatus as claimed in claim 13 wherein the signal generating means includes first and second electrical switches, and wherein the actuating means includes the second electrical switch, and wherein the first and second electrical switches acting in combination, are adapted to generate the predetermined speed signals for the electric motor selectively actuated.

15. An apparatus as claimed in claim 14 wherein the programmable controller includes a memory, and wherein the memory stores the predetermined speed values for each of the electric motors, and wherein upon receiving the predetermined speed signals generated by the first and second electrical switches the programmable controller is adapted to verify that at least one contactor assembly is closed prior to transmitting the signalling sequence to the variable speed motor drive; and wherein when the first electrical switch, when placed in the open position, is adapted to cause the programmable controller to retrieve from the memory a first speed value, and when the first electrical switch is placed in the closed position, is adapted to cause the programmable controller to retrieve from the memory a second speed value.

16. An apparatus as claimed in claim 15 wherein the programmable controller upon positioning the second electrical switch in the open position, is adapted substantially and sequentially to deactivate the variable speed motor drive, pause a predetermined period of time, and then open the closed contactor assembly.

17. An apparatus as claimed in claim 16 wherein a third electrical switch is provided and which is adapted to adjust the speed of the electric motor selectively actuated and wherein the speed value of the electric motor which is adjusted by the third electric switch is stored in the memory of the programmable controller for future use.

18. An apparatus as claimed in claim 12 wherein the actuating means and the signal generating means includes a computer.

* * * * *

UNITED STATES PATENT AND TRADEMARK OFFICE
CERTIFICATE OF CORRECTION

PATENT NO. : 4,947,089
DATED : August 7, 1990
INVENTOR(S) : Donald B. Abel

It is certified that error appears in the above-identified patent and that said Letters Patent is hereby corrected as shown below:

Column 1, Line 38, cancel "dated" and insert
-- adapted --.

Signed and Sealed this

Sixth Day of April, 1993

Attest:

STEPHEN G. KUNIN

*Attesting Officer*   *Acting Commissioner of Patents and Trademarks*